(12) United States Patent
Chien et al.

(10) Patent No.: US 6,610,462 B1
(45) Date of Patent: Aug. 26, 2003

(54) LIQUID CRYSTAL ALIGNMENT USING PHOTO-CROSSLINKABLE LOW MOLECULAR WEIGHT MATERIALS

(75) Inventors: Liang-Chy Chien, Stow, OH (US); Oleg Yaroshchuk, Kyiv (UA)

(73) Assignee: Rolic AG, Zug (CH)

( * ) Notice: Subject to any disclaimer, the term of this patent is extended or adjusted under 35 U.S.C. 154(b) by 356 days.

(21) Appl. No.: 09/637,770

(22) Filed: Aug. 11, 2000

Related U.S. Application Data (60) Provisional application No. 60/148,900, filed on Aug. 13, 1999.

(51) Int. Cl.[7] .............................................. G02F 1/1337
(52) U.S. Cl. ...................... 430/321; 430/320; 349/124; 349/129; 428/1.2
(58) Field of Search ................................ 430/320, 321, 430/394, 396; 349/124, 129; 428/1.2

(56) References Cited

U.S. PATENT DOCUMENTS

| 5,389,698 A | 2/1995 | Chigrinov et al. |
| 5,568,294 A | 10/1996 | Lee |
| 5,784,139 A | 7/1998 | Chigrinov et al. |
| 5,838,407 A | 11/1998 | Chigrinov et al. |
| 5,919,606 A | 7/1999 | Kazlas et al. |
| 5,936,691 A | 8/1999 | Kumar et al. |
| 5,976,640 A | 11/1999 | Yu et al. |
| 6,001,277 A | 12/1999 | Ichmura et al. |

FOREIGN PATENT DOCUMENTS

| EP | 0 955 348 A1 | 10/1999 |
| EP | 1 020 756 A1 * | 7/2000 |
| WO | WO99/17153 * | 4/1999 |

\* cited by examiner

Primary Examiner—John A. McPherson
(74) Attorney, Agent, or Firm—Finnegan, Henderson, Farabow, Garrett & Dunner, LLP (57) ABSTRACT

A method is provided to align liquid crystals in liquid crystal displays by using photo-crosslinkable low molecular weight materials. The material contains a polymerizable group and a photosensitive group. The material is dissolved in a solvent and is disposed onto a substrate and the solvent is removed. The resulting film is then cured with UV light to cross-link and induce anisotropy in the material. Also, a liquid crystal display that contains an alignment layer that is the is the photo-reaction product of a photo-crosslinkable material that contains at least one polymerizable group and at least one photosensitive group.

16 Claims, 6 Drawing Sheets a

LIQUID CRYSTAL ALIGNMENT USING PHOTO-CROSSLINKABLE LOW MOLECULAR WEIGHT MATERIALS

CROSS REFERENCE TO, RELATED APPLICATIONS

The present application claims priority from U.S. Provisional Patent Application No. 60/148,900 filed on Aug. 13, 1999, which is incorporated herein by reference.

GOVERNMENT RIGHTS IN THE INVENTION

The United States Government has a paid-up license in this invention and may have the right in limited circumstances to require the patent owner to license others on reasonable terms as provided for by the terms of Grant DMR89-20147 awarded by the National Science Foundation.

FIELD OF THE INVENTION

The present invention is directed to methods of aligning liquid crystals in a liquid crystal display by applying low molecular weight photo-crosslinkable materials onto a substrate in a liquid crystal display, and then reacting the photo-crosslinkable materials.

BACKGROUND OF THE INVENTION

Liquid crystal displays (LCDs), such as twisted-nematic liquid crystal displays (TN-LCDs) or other LCDs whose optical properties depend on the effect of an applied electric field, require the liquid crystal alignment to be controlled. The conventional method of achieving this control is by confining the liquid crystal layer between two mechanically rubbed surfaces. The liquid crystal molecules adjacent to a surface are aligned in the rubbing direction.

In addition to the drawbacks of generating dust and electrostatic charges, rubbing methods are not adequate to obtain multidomain alignment structure for high-resolution angle active matrix LCDs having the wide viewing angle and high contrast ratio.

These problems can be solved using the photoalignment technique reported in U.S. Pat. Nos. 5,389,698 and 5,838,407 to Chigrinov et al. In this method, anisotropic surfaces of the aligning layers are created using polarized light or a combination of polarized and non-polarized light irradiation. Cinnamate- and coumarin-containing polymers are usually used for this photoalignment technique because of their high photo- and thermal-stability of the induced alignment. Stable anisotropy in such materials is induced through the photo-dimerization (crosslinlking) of photosensitive units. However, this method teaches the use of polymers, preferably of high molecular weight that are applied to a substrate and then photo-irradiated.

Another method used in the art for aligning liquid crystals is reported in U.S. Pat. No. 6,001,277 to Ichimura et al. Ichimura '277 uses a resin that contains a photoisomerizable and dichroic structural unit. Ichimura '277, however, does not disclose a resin with a photo-crosslinkable group, or applying an unreacted material to the substrate and then reacting and aligning by photo-irradiation.

U.S. Pat. No. 5,568,294 to Lee discloses a liquid crystal display having a liquid crystalline polymer as an alignment layer that is disposed in the liquid crystal display proximal to the liquid crystals in the display. Lee '294 adds a polymer layer disposed underneath the liquid crystalline polymer. Lee '294, however, does not disclose an alignment layer with a resin containing a photo-crosslinkable group, or applying an unreacted material to the substrate and then reacting and aligning by photo-irradiation.

The art lacks a photoalignment method using low molecular weight photo-crosslinkable materials that are applied to a substrate and then irradiated with light to react the material and induce anisotropy.

It is an object of the invention to provide a method for aligning liquid crystals by applying low molecular weight photo-crosslinkable materials onto the substrate in a liquid crystal cell and then reacting the material and inducing anisotropy in the reacted material.

SUMMARY OF THE INVENTION

The present invention provides a method for forming an alignment layer for aligning liquid crystals comprising: dissolving a photo-crosslinkable material in a solvent, wherein said photo-crosslinkable material contains at least one polymerizable group and at least one photosensitive group, and wherein said photo-crosslinkable material has a weight average molecular weight less than about 1,000; depositing said photo-crosslinkable material and said solvent on a substrate; removing the solvent; and irradiating the photo-crosslinkable material selectively with linearly polarized ultra-violet light to provide an alignment layer.

The present invention also provides a method of forming a liquid crystal display comprising: providing two opposed substrates each covered with an electrode; dissolving a photo-crosslinkable material in a solvent, wherein said photo-crosslinkable material contains at least one polymerizable group and at least one photosensitive group, and wherein said photo-crosslinkable material has a weight average molecular weight less than about 1,000; depositing said photo-crosslinkable material and said solvent on at least one of the electrode covered substrates on the surface facing the other substrate; removing the solvent to form a liquid crystal film; irradiating the photo-crosslinkable material selectively with linearly polarized ultra-violet light to provide an alignment layer; placing spacers between the substrates; sealing three of the sides of the substrate to form a cell; filling the cell with a liquid crystal; and sealing the cell.

The present invention also provides a liquid crystal display comprising a first and second cell wall structure, electrodes disposed on facing sides of said first and second cell wall structures, an alignment layer disposed on at least one of said electrodes, and liquid crystals disposed within a space between the first and second cell wall structures, wherein the alignment layer comprises a photo-reaction product of a photo-crosslinkable material that contains at least one polymerizable group and at least one photosensitive group, wherein said photo-crosslinkable material has a weight average molecular weight less than about 1,000.

DETAILED DESCRIPTION OF THE INVENTION

Disclosed is a method of liquid crystal alignment using low-molecular-weight photo-crosslinkable materials (LMWPCM). The main feature of this invention is that a film of LMWPCM is cast on substrate and subsequently cross-linked and polymerized, such as by the irradiation or thermal-curing process, to produce a resin alignment layer. Using polarized light irradiation it is possible to combine the processes of solidification and induction of the anisotropy. By low molecular weight, it is meant that the weight average molecular weight or the starting photo-crosslinkable material before reaction is less than about 1,000. Once reacted, the molecular weight can be targeted to a desired molecular weight by controlling the photo-irradiation of the photo-crosslinkable material.

A functional material is dissolved in a solvent and coated onto a substrate. The solvent is then evaporated leaving a film of the functional material. The film is then irradiated with UV light. By controlling the UV irradiation, different alignments with a wide range of angle between the liquid crystal molecule and the substrate surface can be achieved with appropriate molecular structure modification on the low molecular weight photo-crosslinkable materials. The wide range of angle is preferably from about 1° to about 89°.

A liquid crystal display can then be fabricated using the substrates prepared by the alignment method. The alignment method of the present invention can be used with any known liquid crystals.

The light used is ultra-violet light in order to induce a photo-reaction in the photo-crosslinkable materials, which have absorption in the ultra-violet region. The light is linearly polarized in order to effect reaction and induction of anisotropy.

Functional materials consist of any polymerizable group and any photosensitive group that are suitable for this in-situ polymerization and photoalignment technology. Other multifunctional materials containing multiple polymerizable groups or photosensitive groups can also be used to form cross-linked film for photoalignment. Mono-component as well as multi-component mixtures of LMWPCM can be used.

Examples of the polymerizable group include, but are not limited to, acrylates, methacrylates, vinyls, vinyl ethers, and epoxies. Examples of the photosensitive group include, but are not limited to, cinnamate, coumarin, maleimide, chalcone, and bis(benzilidine).

Coating the material onto the substrate can be accomplished by any method, such as by spin coating or dip coating.

When the photo-crosslinkable is photo-reacted, a resin layer is formed as the alignment layer. Optionally, a mask may be used to selectively irradiate the photo-crosslinkable material so that alignment can be varied across the substrate. Multiple masks may be used in which selected areas are irradiated in successive steps.

The resulting alignment layer formed after photo-irradiation preferably has a thickness from about 0.2 to about 70 nm (2–700 Å). More preferably, the alignment layer has a thickness from about 0.2 to about 30 nm.

Figure 4:
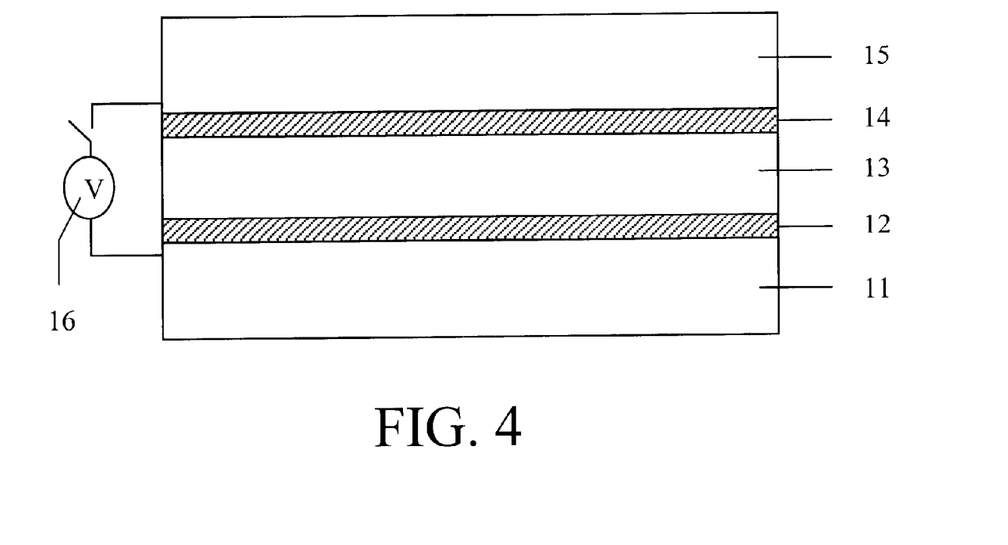
FIG. 4 is a schematic of a liquid crystal cell.

A liquid crystal cell typically comprises opposed substrates, electrodes on the substrates, alignment layers disposed over the electrodes, spacers between the substrates to control the thickness of the liquid crystal cell, and liquid crystals disposed between the substrates. FIG. 4 is a schematic of a typical liquid crystal cell. Layers 11 and 15 represent the combined substrate and electrodes. Layers 12 and 14 represent the alignment layers. Layer 13 represents the liquid crystal material. And, layer 16 is a voltage source to power the cell.

The substrate can be any material commonly used for fabricating liquid crystal cells. Materials such as glass, quartz or plastic can be used. The substrate materials can also be any materials commonly used for fabricating chips, for example silicon.

The electrodes of the liquid crystal cell can be fabricated from any material known to be used for electrodes for liquid crystal cells. Suitable materials for the electrodes include, but are not limited to, indium-tin-oxide (ITO), stannic oxide ($SnO_2$), aluminum, chromium, silver, or gold.

This revolutionary liquid crystal alignment method provides several advantages for the preparation of liquid crystal flat panel display cell. The method provides simplification of the synthesis of materials for alignment layers. Also provided is that the crosslinking and/or polymerization process is realized in the thin layers of the aligning materials. When using mixtures of two or more reactive components, the method allows one to change the liquid crystal aligning properties of the films, for instance, the direction of the easy axis of liquid crystal orientation, pretilt angle, etc. The method also reduces of the number of curing steps for photo-aligning layers. Additionally, pre-alignment of the LMWPCM films having liquid crystal phases can be easily realized before curing.

The method of the present invention has all the known advantages of photoalignment, and the quality of the liquid crystal alignment is at least equal to alignments provided by the best polymeric materials.

These materials and method of the present invention may also be used in applications for photo-induced birefringence as in retardation films and optical storage media, polymer liquid crystal films, and with liquid crystal displays with flexible substrates.

SPECIFIC EMBODIMENTS OF THE INVENTION

Materials for liquid crystal alignment by means of crosslinking low-molecular-weight materials are described as follows.

1. Cinnamate-containing methacrylate and vinyl monomers with an addition of 10 weight % of photoinitiator IRGACURE® 369 (Ciba Additive Inc.) were dissolved in dichloroethane with a concentration of 50 g/l. The chemical structures of the crosslinkable low molecular weight materials are shown below.

a) LC-1-23B b) LGC-2-18-ChA c) Photoinitiator:
   IRGACURE® 369 from Ciba Additive Inc.
2. Cinnamate-containing methacrylate or vinyl monomer with addition of thermal initiator bis-(azoisobutylnitrile) (AIBN) at a ratio of 20 weight % in the mixture. This mixture was dissolved in dichloroethane with a concentration of 50 g/l.
3. Cinnamate crosslinkable materials. (CN1)

EXAMPLE 1

A layer of monomer 1(a) (LC-1-23B) with the addition of a thermal initiator TI1 at 20 weight % was formed on a glass substrate by spin coating at 3000 rpm for 10 s using a 50 g/l solution in toluene. The coated substrate was kept at 50° C. for 10 min in order to remove the solvent. Then the substrate was cured at 150° C. for 30 min. Part of the substrate was irradiated with polarized UV light from a high pressure Xe-lamp. Intensity of the light in the sample position and exposure time was 8 mW/cm² and 15 min, respectively.

The cell was fabricated from the irradiated substrate and a rubbed substrate coated by polyimide (PI3510 from Nissan). The cell combination was produced in such a way that the rubbing direction on the rubbed substrate was perpendicular to the UV polarization direction on the irradiated substrate. The substrates were separated by 20 μm spacers and stuck by epoxy glue. The prepared cell was filled at room temperature with liquid crystal ZLI 2293 from Merck.

Figure 1:
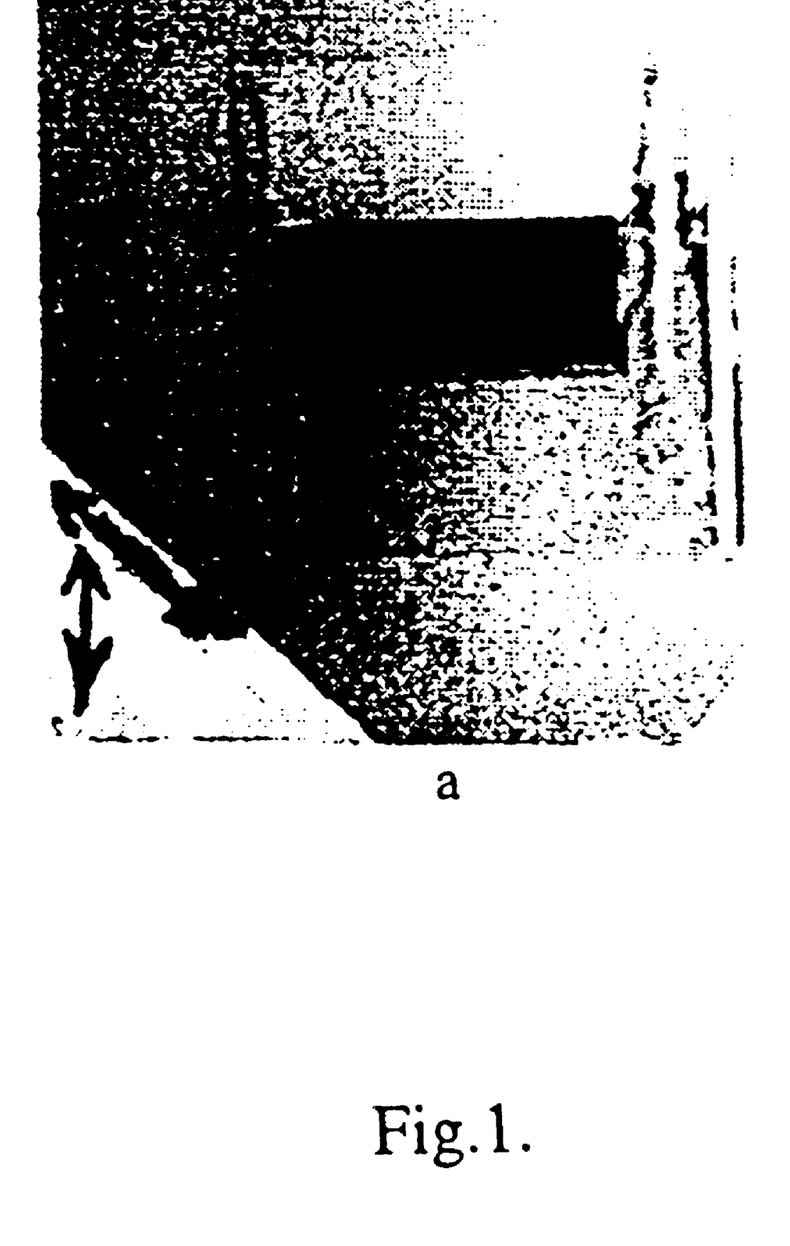
FIG. 1a is a photomicrograph of a multidomain liquid crystal cell prepared with a rubbed substrate and a substrate of the present invention at an analyzer axis forming an angle of 45° with the axis of the polarizer.
FIG. 1b is a photomicrograph of a multidomain liquid crystal cell prepared with a rubbed substrate and a substrate of the present invention at an analyzer axis forming an angle of 0° with the axis of the polarizer.
FIG. 1c is a photomicrograph of a multidomain liquid crystal cell prepared with a rubbed substrate and a substrate of the present invention at an analyzer axis forming an angle of 90° with the axis of the polarizer.

The cell was then tested. High quality planar liquid crystal alignment was detected by observing the cell in crossed polarizers. Three domains with different direction of the UV light polarization E were produced on the photo-cured substrate. In the combined cell, the direction of the E in the domains on the photo-cured substrate was parallel, perpendicular or 45° with respect to the rubbing direction on the rubbed substrate. High quality liquid crystal orientation in the each domain was detected (FIG. 1).

FIGS. 1a–1c show multidomain combined liquid crystal cells prepared from rubbed polyimide (PI 3510 from Nissan) substrate (on the bottom) and LC-1-23B, irradiated with polarized light (on the top) between two polarizers. The rubbing direction is parallel to the axis of the polarizer. The direction of the UV light polarization E in the domains 1, 2, and 3 on the photo-cured substrate forms with the direction of rubbing the angle 0°, 45°, and 90°, respectively. The cell gap is 20 μm. The cell is filled with nematic liquid crystal ZLI 2293 from Merck. Figures a, b, and c correspond to the direction of the analyzer axis forming 45°, 0° and 90° with the axis of polarizer, respectfully.

Example 2

The same procedure as in Example 1 was used except that both substrates were covered by the photo-curing material. The combination of the substrates was produced in such a way that UV polarization directions on both substrates were parallel. High quality planar alignment was obtained.

Example 3

The same procedure as in example 2 was used except that the combination of the substrates was produced in such a way that UV polarization directions on the substrates were perpendicular. Homogeneous twist liquid crystal structure in the irradiated area was obtained.

Example 4

Same procedure as in Example 1 with both substrates, except that monomer 1(b) (LGC-2-18-ChA) with addition of photo initiator PI1 (10 weight %) was used for the production of photo-cured alignment layer. Also, high temperature curing was excluded. The cell was filled with liquid crystal K15 from Merck. Homogeneous planar liquid crystal texture in the irradiated area was detected (FIG. 2).

Figure 2:
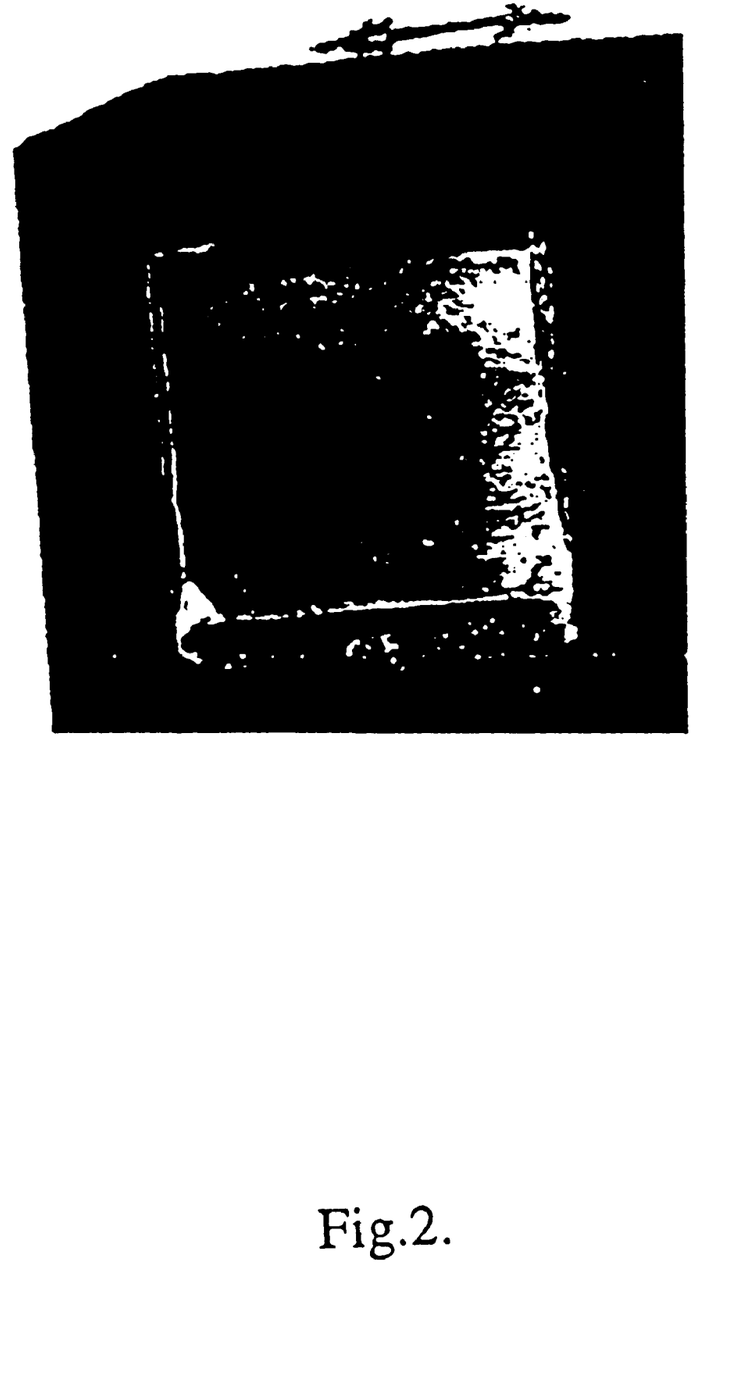
FIG. 2 is a photomicrograph of a combined parallel liquid crystal cell with a thickness of 20 μm prepared from a rubbed polyimide substrate and a LGC-2-18-ChA with IRGACURE® 369 (10 weight %) substrate irradiated with polarized light, and the cell is filled with nematic liquid crystal K15.

FIG. 2 shows a combined parallel cell with a thickness of 20 μm prepared from the rubbed polyimide (PI 3510 from Nissan) substrate and LGC-2-18-ChA+IRGACURE®369 (10 weight %) substrate irradiated with polarized light (8 mW/cm², 15 min). The cell is filled with nematic liquid crystal K15 from Merck and is placed between a pair of crossed polarizers.

Example 5

Same as Example 4 except that the photo-curing substrate was initially cured with non polarized UV light (22 mW/cm², for 5 min). Then part of the cell was irradiated with polarized light as described in Example 1. Liquid crystal alignment was improved in comparison to Example 4.

Example 6

The cell was prepared in the same manner as in Example 4 except the photo-curing substrate was coated by CN1 (Compound 3) using a solution (50 g/l) in toluene. Homogeneous planar liquid crystal texture of liquid crystal ZLI4801 from Merck was detected in the irradiated part of the cell (FIG. 3).

Figure 3:
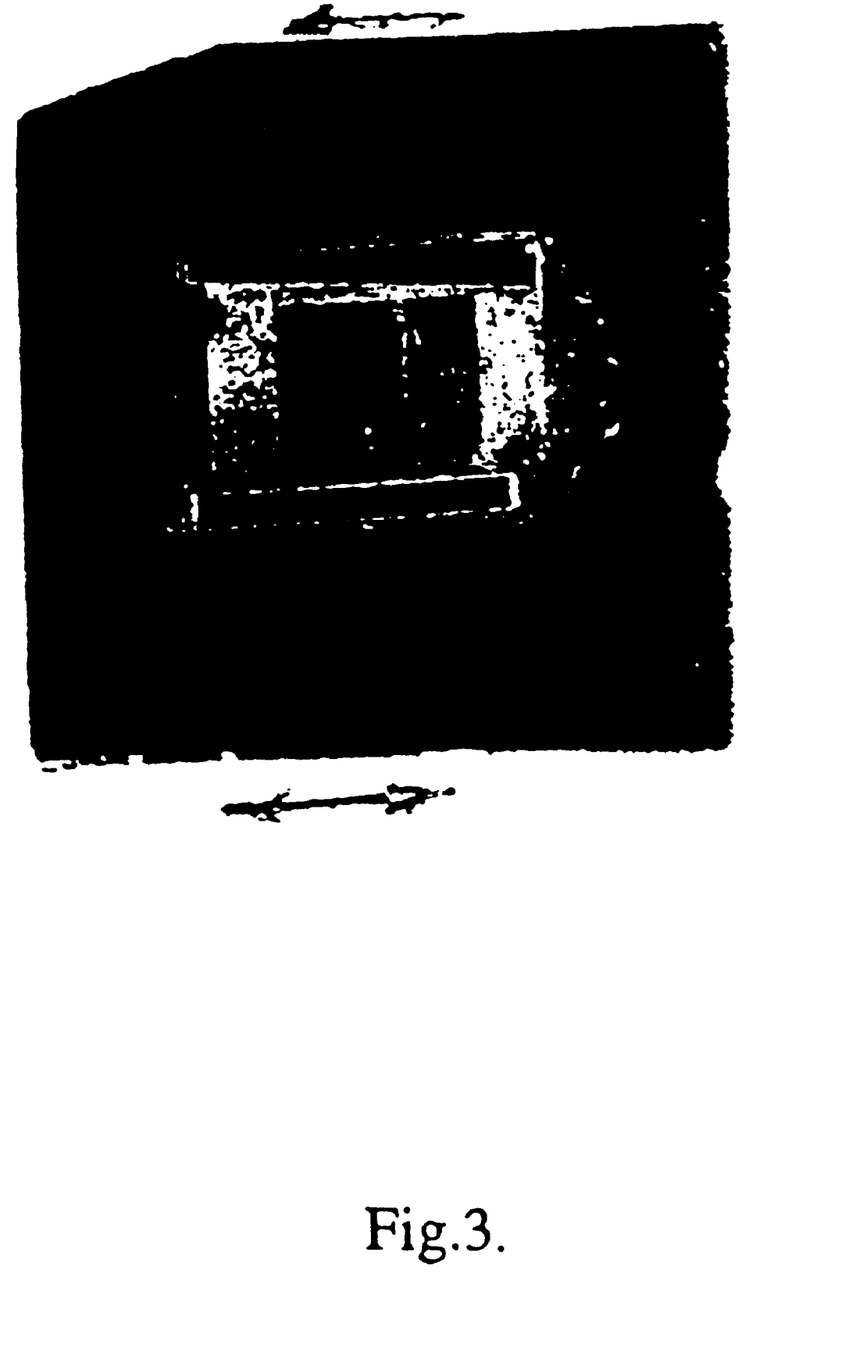
FIG. 3 is a photomicrograph of a combined parallel cell with a thickness of 20 μm prepared from a rubbed polyimide substrate and CN1 substrate irradiated with polarized light, and the cell is filled with nematic liquid crystal ZLI4801.

FIG. 3 shows a combined parallel cell with a thickness of 20 μm prepared from the a rubbed polyimide (PI3510 from Nissan) substrate and a CN1 substrate irradiated with polarized light (8 mW/cm², 15 min). The cell is filled with nematic liquid crystal ZLI4801 from Merck.

It should be appreciated that the present invention is not limited to the specific embodiments described above, but includes variations, modifications and equivalent embodiments defined by the following claims.

What is claimed is:
1. A method for forming an alignment layer for aligning liquid crystals comprising:
   a. dissolving a photo-crosslinkable material in a solvent, wherein said photo-crosslinkable material contains at least one photo-crosslinkable group and at least one additional polymerizable group, and wherein said photo-crosslinkable material has a weight average molecular weight less than about 1,000;

b. depositing said photo-crosslinkable material and said solvent on a substrate;

c. removing the solvent; and d. irradiating the photo-crosslinkable material selectively with linearly polarized ultra-violet light in order to effect reaction and induction of anisotropy in the material to provide an alignment layer.

2. The method of claim 1, wherein the depositing is one of spin coating and dip coating.

3. The method of claim 1, wherein the alignment layer has a thickness ranging from about 0.2 to about 70 nm.

4. The method of claim 1 further comprising laying a patterned mask over the alignment layer prior to the irradiating step and removing the mask after the irradiating step.

5. The method of claim 1, wherein the polymerizable group is selected from the group consisting of acrylates, methacrylates, vinyls, vinyl ethers, epoxies, and mixtures thereof.

6. The method of claim 1, wherein the photo-crosslinkable group is selected from the group consisting of cinnamate, coumarin, maleimide, chalcone, bis(benzilidine), and mixtures thereof.

7. A method of forming a liquid crystal display comprising:

a. providing two opposed substrates each covered with an electrode;

b. dissolving a photo-crosslinkable material in a solvent, wherein said photo-crosslinkable material contains at least one photo-crosslinkable group and at least one additional polymerizable group, and wherein said photo-crosslinkable material has a weight average molecular weight less than about 1,000;

c. depositing said photo-crosslinkable material and said solvent on at least one of the electrode covered substrates on the surface facing the other substrate;

d. removing the solvent;

e. irradiating the photo-crosslinkable material selectively with linearly polarized ultra-violet light in order to effect reaction and induction of anisotropy in the material to provide an alignment layer;

f. placing spacers between the substrates;

g. sealing three of the sides of the substrate to form a cell;

h. filling the cell with a liquid crystal; and i. sealing the cell.

8. The method of claim 7, wherein the depositing is one of spin coating and dip coating.

9. The method of claim 7, wherein the alignment layer has a thickness ranging from about 0.2 to about 70 nm.

10. The method of claim 7 further comprising laying a patterned mask over the alignment layer prior to the irradiating step and removing the mask after the irradiating step.

11. The method of claim 7, wherein the polymerizable group is selected from the group consisting of acrylates, methacrylates, vinyls, vinyl ethers, epoxies, and mixtures thereof.

12. The method of claim 7, wherein the photo-crosslinkable group is selected from the group consisting of cinnamate, coumarin, maleimide, chalcone, bis(benzilidine), and mixtures thereof.

13. A liquid crystal display comprising a first and second cell wall structure, electrodes disposed on facing sides of said first and second cell wall structures, an alignment layer disposed on at least one of said electrodes, and liquid crystals disposed within a space between the first and second cell wall structures, wherein the alignment layer comprises a photo-reaction product of a photo-crosslinkable material that contains at least one photo-crosslinkable group and at least one additional polymerizable group, wherein said photo-crosslinkable material has a weight average molecular weight less than about 1,000.

14. The liquid crystal display of claim 13, wherein the alignment layer has a thickness from about 0.2 to about 70 nm.

15. The liquid crystal display of claim 13, wherein the polymerizable group is selected from the group consisting of acrylates, methacrylates, vinyls, vinyl ethers, epoxies, and mixtures thereof.

16. The liquid crystal display of claim 13, wherein the photo-crosslinkable group is selected from the group consisting of cinnamate, coumarin, maleimide, chalcone, bis(benzilidine), and mixtures thereof.

* * * * *